(12) United States Patent
Mehlum et al.

(10) Patent No.: US 8,949,194 B1
(45) Date of Patent: Feb. 3, 2015

(54) ACTIVE RECORDS MANAGEMENT

(75) Inventors: Rune Mehlum, Moss (NO); Geir Hansen, Oslo (NO)

(73) Assignee: EMC Corporation, Hopkinton, MA (US)

( * ) Notice: Subject to any disclaimer, the term of this patent is extended or adjusted under 35 U.S.C. 154(b) by 112 days.

(21) Appl. No.: 13/436,466

(22) Filed: Mar. 30, 2012

(51) Int. Cl.
*G06F 17/30* (2006.01)
*G05B 23/02* (2006.01)

(52) U.S. Cl.
CPC .......... *G05B 23/02* (2013.01); *G06F 17/30286* (2013.01)
USPC .......................................... 707/668; 715/511

(58) Field of Classification Search
CPC ... G05B 23/02; G05B 15/02; G06F 17/30286
USPC ................. 707/708, 104.1; 715/511
See application file for complete search history.

(56) References Cited

U.S. PATENT DOCUMENTS

| | | | |
|---|---|---|---|
| 6,826,609 B1 * | 11/2004 | Smith et al. .................... | 709/225 |
| 7,433,829 B2 * | 10/2008 | Borgia et al. ................. | 705/7.13 |
| 7,630,986 B1 * | 12/2009 | Herz et al. ............................ | 1/1 |
| 7,844,582 B1 * | 11/2010 | Arbilla et al. ................. | 707/694 |
| 2002/0178271 A1 * | 11/2002 | Graham et al. ................ | 709/229 |
| 2004/0216039 A1 * | 10/2004 | Lane et al. ..................... | 715/511 |
| 2005/0256735 A1 * | 11/2005 | Bayne ............................... | 705/1 |
| 2007/0179987 A1 * | 8/2007 | Lim ............................... | 707/200 |
| 2007/0271308 A1 * | 11/2007 | Bentley et al. ................ | 707/200 |
| 2007/0294199 A1 * | 12/2007 | Nelken et al. .................... | 706/50 |
| 2007/0294209 A1 * | 12/2007 | Strub et al. ........................ | 707/1 |
| 2008/0086506 A1 * | 4/2008 | DeBie et al. ................ | 707/104.1 |
| 2010/0242088 A1 * | 9/2010 | Thomas ............................. | 726/3 |
| 2011/0320425 A1 * | 12/2011 | Nelson .......................... | 707/708 |

* cited by examiner

*Primary Examiner* — James Trujillo
*Assistant Examiner* — Thong Vu
(74) *Attorney, Agent, or Firm* — Van Pelt, Yi & James LLP

(57) ABSTRACT

Automated detection and management of electronic records is disclosed. An electronic content is detected. It is determined through automated processing of the electronic content that a records management policy applies to the electronic content. It is ensured through automated processing that the electronic content is stored as required by the records management policy.

29 Claims, 4 Drawing Sheets

ACTIVE RECORDS MANAGEMENT

BACKGROUND OF THE INVENTION

Records management system enable records administrators to ensure that documents and other content are maintained as records in compliance with applicable internal policies and/or legal, regulatory, or other externally imposed requirements. Traditionally, records management solutions have been passive, e.g., relying on the performance of manual tasks, such as a human filing an electronic document in a particular physical and/or logical storage location, to ensure that the electronic document is maintained properly as a record. Typical records management solutions do not provide for comprehensive and more fully automatic identification and maintenance of electronic records. In a typical approach, misfiling of electronic documents may not be detected nor any effective responsive action taken, which leads to uncontrolled records sprawl and potential legal exposure due to the fact that the entity is not able to locate pertinent content.

BRIEF DESCRIPTION OF THE DRAWINGS

Various embodiments of the invention are disclosed in the following detailed description and the accompanying drawings.

DETAILED DESCRIPTION

Figure 1:
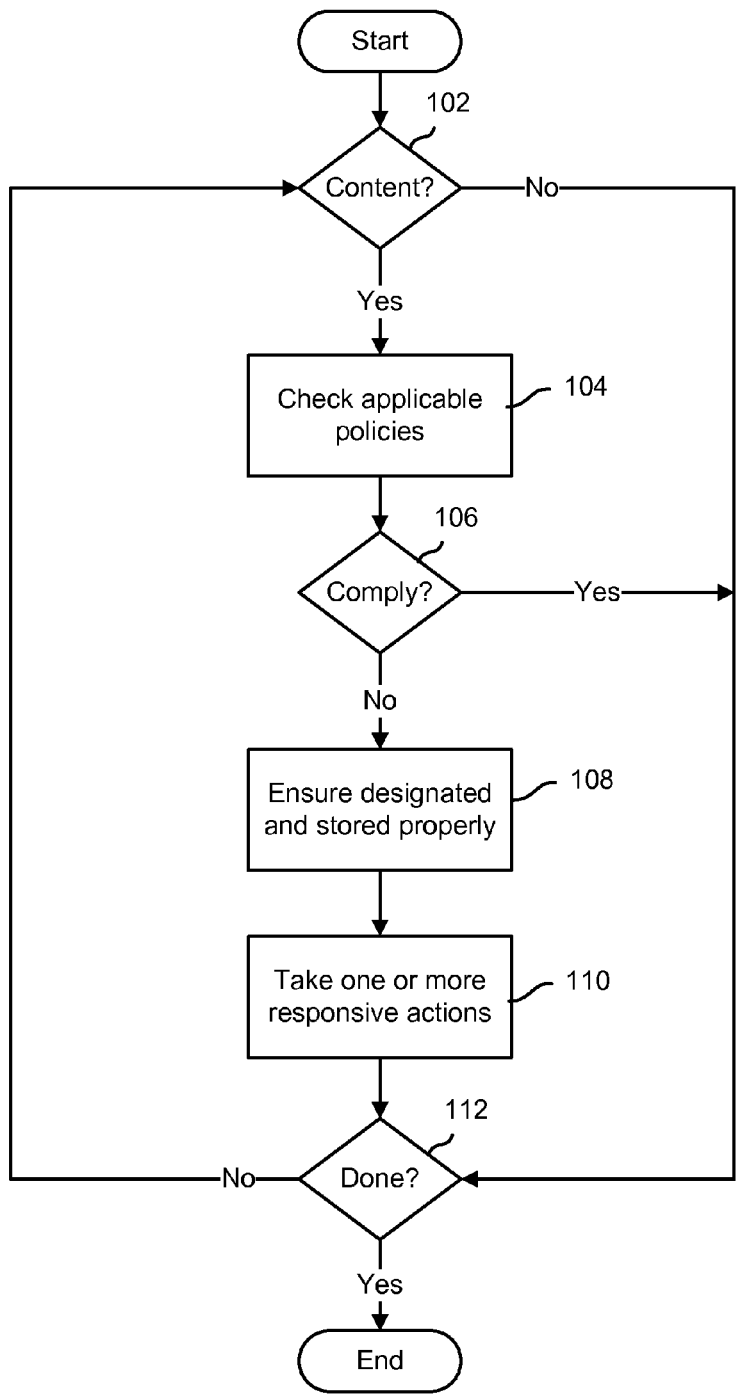
FIG. 1 is a flow chart illustrating an embodiment of an active records management process.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Active records management is disclosed. Active agents are deployed to detect electronic documents (or other content), for example at servers and/or endpoints at which they are created, saved, or otherwise stored, at network nodes through which they are communicated, etc. Content required to be maintained as a record is identified. In various embodiments, content potentially required to be designated, stored, and/or otherwise managed as a record is or may be detected "in flight", for example upon being transmitted, created, first saved, etc., rather than and/or in addition to efforts to detect content while "at rest", for example after it has been saved to a file server or other storage. A determination is made as to whether an action taken with respect to the content, for example by a user, an application, etc., complies with applicable record requirements. If not, compliance processing is performed to ensure the content is maintained compliantly as a record. Optionally, feedback is provided, for example directly to a user, to train them to store similar content compliantly in the future, or a warning is sent to the Records Administrators alerting them of the breach of compliance in a workflow in the system which could include a copy of the content which is handled non-compliantly. In some embodiments, feedback is provided to a user who attempts to store or send content non-compliantly immediately and directly, a manner of providing feedback that is considered likely to be most effective in modifying user behavior, specifically to cause the offending user to store the same or similar content compliantly in the future.

FIG. 1 is a flow chart illustrating an embodiment of an active records management process. Active agents detect content, such as an electronic document (102). For example, agents may be deployed at one or more of endpoints, such as individual client computer systems, at servers such as file servers, and/or at network nodes, such as a firewall, router, or other node through which enterprise or other local data may be communicated via an external network such as the Internet. The agents check applicable records management policies (or other rules) (104), e.g., to determine whether the detected content is required to be maintained as a record. If content required to be maintained as a record is detected (102, 104), it is determined whether an action with which the content is associated satisfies the applicable records policy (106). For example, if an electronic document is being saved on a SharePoint™ or other file server designed to facilitate file sharing, a determination may be made that under an applicable records management policy the document may not be stored in such a location, or that a copy must in addition be stored in a records management or other repository and managed as a record to ensure compliance with the applicable policy. If the associated action is already compliant, processing of that document ends and subsequently detected content, if any, is processed as detected (106, 112, 102). If the associated action is not compliant (106), action is initiated to ensure the document is designated as a record and stored as required by the applicable policy (108). Optionally, feedback is provided (110). For example, in some embodiments, the user who took the associated action (for example, to send, move, save, etc. the content) is provided feedback in the form of an admonition and opportunity to store the content compliantly.

In some embodiments, in response to a detected attempt to store and/or send content non-compliantly, a user interface is provided to the user who attempted to take the non-compliant action. The user may be offered an option to file the content compliantly, for example in a compliant logical location in the records management archive, such as a location identified from among the most used locations in the archive. The user may be given the option to store or send the content non-compliantly, for example upon indicating a reason the user is electing to do so. For example, a user may indicate via the interface that the content was detected in error as being subject to the records management requirement. In various embodiments, the system may be configured to take one or more of the following actions automatically: make a copy of the content and archive it compliantly; send the content or a copy thereof on an automated workflow to be reviewed by a records manager, and stored compliantly if determined by the manager to be required; and to take one or both of the foregoing actions without any notice being provided to the user who stored and/or sent (and/or attempted to store or send) the content non-compliantly.

In various embodiments, feedback (110) may include sending an alert or providing other information to a records administrator, for example to enable that person to train, re-train, and/or discipline the user who took or attempt to take the non-compliant action with respect to the content. In some embodiments, a report or other data detailing a violation and/or summarizing violations, interventions, etc. may be generated and provide to records managers, a risk management department, the legal department, etc., to enable recipient managers and/or divisions to address egregious violations, repeated non-compliance by a particular user or group of users, discern and respond to trends, etc.

Once compliance has been ensured (108, 110), the process resumes waiting for additional content, if any, to be detected (102). Subsequent iterations continue as/if further content is detected until the process is terminated (112).

Figure 2:
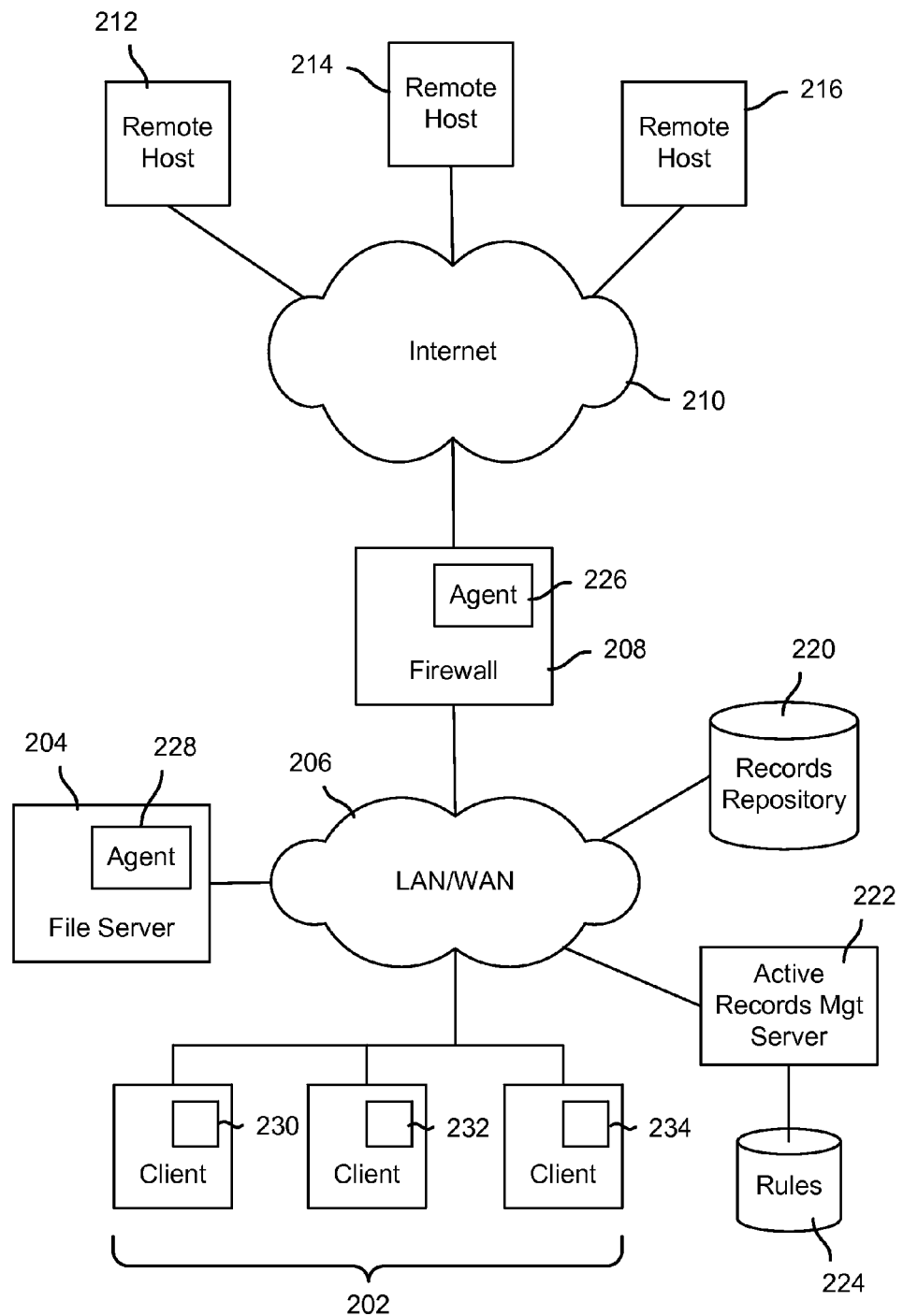
FIG. 2 is a block diagram illustrating an embodiment of an active records management solution.

FIG. 2 is a block diagram illustrating an embodiment of an active records management solution. In the example shown, a plurality of client systems 202 are connected to a file server 204 via a local/wide area network 206. The client systems 202 and file server 204 have access via a firewall 208 to the Internet 210, to which remote hosts such as hosts 212, 214, and 216 are connected. In the example shown, client systems 202 and file server 204 are associated with an enterprise (or other entity). A records repository 220 is configured to store and managed electronic documents, such as files, as business and/or legal records. Examples of such management include ensuring documents designated as records are stored for a prescribed duration and/or in a prescribed location, format, and/or manner; ensuring records no longer required or permitted to be retained are disposed of in a prescribed way; and ensuring that records designated to be maintained in an existing form are not changed.

In the example shown, an active records management platform 222 is provided and configured to enforce actively, as described herein, records management policies stored in a policy/rule database 224. In some embodiments, a records manager, administrator, or other authorized user defines rules to be enforced actively by the platform 222. The rules may be based, for example, legal or regulatory requirements, internal policy, best practices, etc. In some embodiments, an administrative user interface may be provided to facilitate selection of preconfigured rules, for example based on known laws and regulations governing business or other records.

In various embodiments, once the applicable policies have been defined by a records manager or other administrator, active records management platform 222 operates to enforce the policies at least in part by detect content attempted to be stored and/or sent non-compliantly. Non-compliant actions are detected, for example using pattern matching and/or other techniques, and responsive action, including ensuring the content is stored compliantly and/or feedback provided, e.g., immediately and directly to the user, via a records manager, etc., as described herein.

In the example shown in FIG. 2, active records management agents have been deployed and configured to detect electronic documents and ensure that any records management policies that may be applicable to them are enforced. A network agent 226 is deployed at firewall 208 and configured to detect electronic documents, for example in inbound/outbound communications sent/received via firewall 208. A server agent 228 is deployed at file server 204 and configured to detect electronic records, for example in connection with file "save" events, and to ensure that any applicable records management policies are enforced. Endpoint agents 230, 232, and 234, deployed on client systems 202, detect locally stored electronic documents and ensure they are stored and managed as required by any applicable records management policies. In some embodiments, the agents shown in FIG. 2 detect content to which records management policies apply at least in part using techniques similar to those that have been used in data loss protection solutions, such as the RSA Data Loss Protection™ solutions offered by EMC Corporation, for example, to detect that sensitive or otherwise confidential data prohibited from being sent outside of the enterprise has been sent and/or stored in a location that is prohibited. In the application/use disclosed herein, similar detection techniques (e.g., regular expression and/or other pattern matching, author/sender/receiver identity and/or attributes, content and/or associated metadata, etc.) are used to match electronic documents (or other content) to applicable records management policies (if any). Further, in the approach described herein, in various embodiments specific steps are taken to ensure and/or facilitate compliant storage and management of documents that are subject to one or more records management policies.

Figure 3:
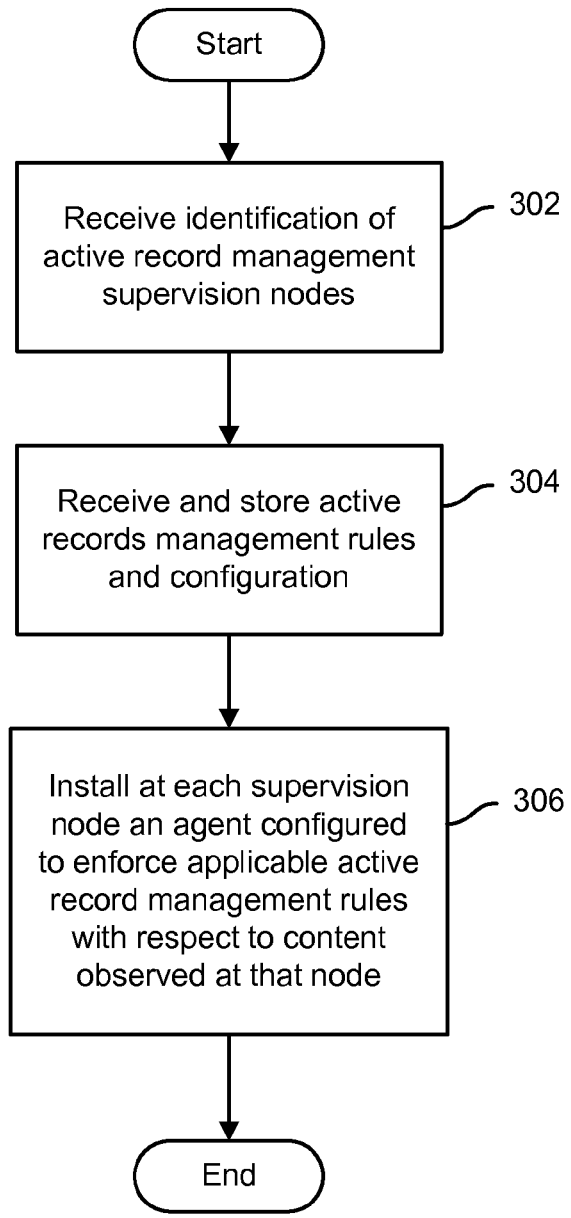
FIG. 3 is a flow diagram illustrating an embodiment of an active records management process.

FIG. 3 is a flow diagram illustrating an embodiment of an active records management process. In the example shown, an identification of active records management supervision nodes is received (302), e.g., via an administrative user interface. For example, in the example shown in FIG. 2 an identification of one or more of firewall 202, file server 204, and endpoints (client systems) 230, 232, and/or 234 may have been received. Active records management rules (e.g., policies) and/or configuration data are received and stored (304). For example, rules and configuration data may be received via an administrative interface of an active records management server, such as server 222 of FIG. 2, and stored in a rules database, such as rules database 224 of FIG. 2. At each supervision node, an agent is installed and configured to enforce applicable active records management rules with respect to content observed at that node (306). In some embodiments, content required (or which may be required) to be managed actively as a record is detected by pattern and/or keyword matching and/or other techniques, as described herein. Examples of agents include network agent 226, server agent 228, and endpoint agents 230, 232, and 234.

Once deployed and configured, in various embodiments active records management agents observe or otherwise detect content and enforce records management policies, as applicable.

Figure 4:
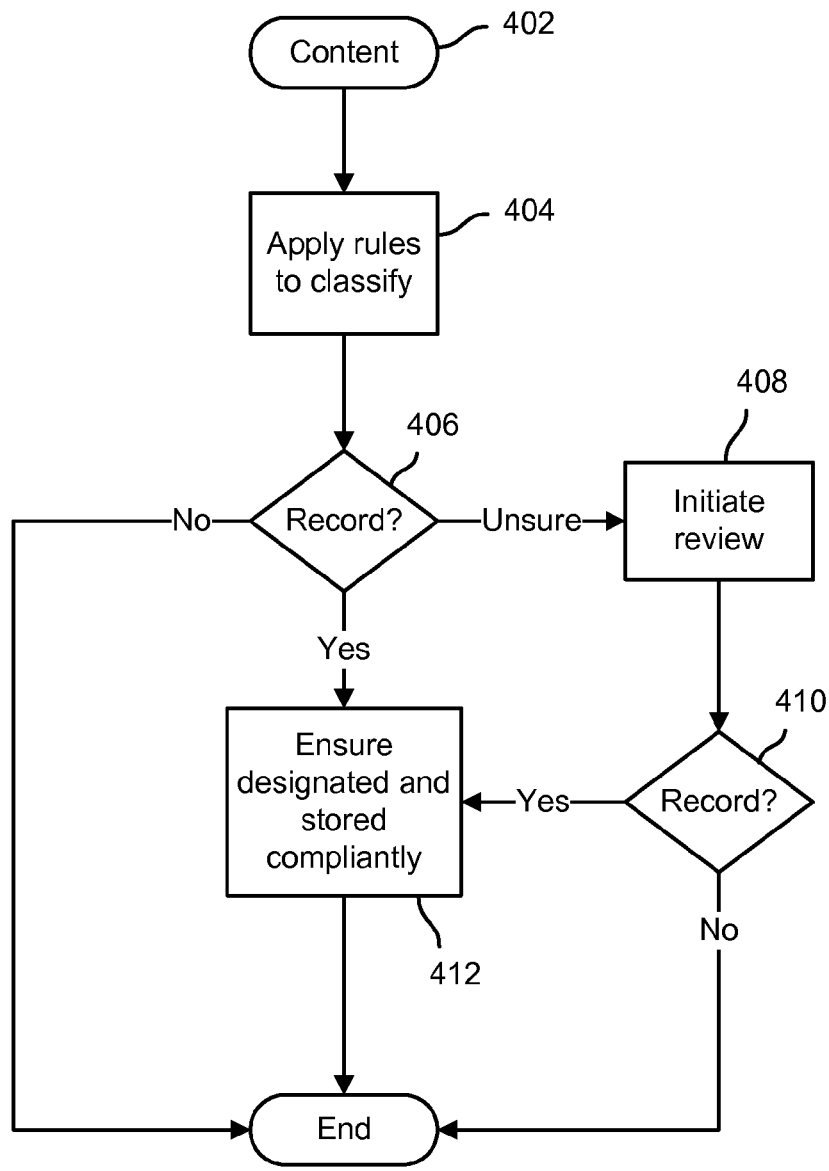
FIG. 4 is a flow diagram illustrating an embodiment of an active records management process.

FIG. 4 is a flow diagram illustrating an embodiment of an active records management process. In various embodiments, the process of FIG. 4 is implemented by active records management agents, such as network agent 226, server agent 228, and endpoint agents 230, 232, and 234 of FIG. 2. In the example shown, content to be subjected to active records management processing is received (402). Examples of receiving content to be subjected to active records management processing include, without limitation, detecting content, e.g., detecting a document creation and/or save event, identifying a pattern match in a stream of data in transit, etc. Rules (policies) are applied to the received content to classify the content, e.g., as a record subject to a records management policy or not (404). If the content is determined not to be a record (406), the process of FIG. 4 ends with respect to that content. If the content cannot be classified with a prescribed degree of confidence (406), further processing is initiated (408), for example a business process that may include human review if needed, to determine more conclusively whether the content should be classified as a record. If the content is determined after further review to not be a record (410), the process of FIG. 4 ends with respect to that content. If the content is classified as a record to which a records management policy applies, either fully automatically (406) or after further review (408), further processing is performed to ensure the content is designated as a record and that it is stored and otherwise managed as required by the applicable records management policy or policies (412).

In various embodiments, as noted above, active records management processing includes providing feedback, for example directly to user who has attempted to store and/or transmit an electronic document non-compliantly, to ensure the user understands and learns how to store content of the detected type compliantly. In various embodiments, alerts and/or reports may be generated and made available for use by records administrators, for example to identify, provide training, and/or take other corrective action with respect to users who repeatedly attempt to store or communicate content in ways that do not conform to the requirements of applicable records management policies.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method of managing electronic records, comprising:
   detecting an action with respect to an electronic content, wherein the electronic content is not previously associated with a first records management policy;
   classifying, in response to detecting the action, the electronic content by applying one or more rules, wherein electronic content classified as a record within a predetermined degree of confidence is subject to the first records management policy;
   in the event that the electronic content is determined to be a record within the predetermined degree of confidence, ensuring through automated processing that the at least one detected action with respect to the electronic content is in compliance with the first records management policy at least in part by:
      in the event that the at least one detected action with respect to the electronic content is determined to be not in compliance with the first records management policy, prompting a user attempting the non-compliant action to indicate a reason for the non-compliant action;
      determining whether to perform the non-compliant action based at least in part on the reason indicated by the user; and
      determining a manner of providing the feedback communication that will most effectively modify a behavior of the user who attempted the detected non-compliant action to understand and learn how to store the electronic content compliantly in the event it is determined to not perform the non-compliant action based at least in part on the reason indicated by the user, wherein the feedback communication is provided directly to the user who attempted the detected non-compliant action.

2. The method of claim 1, wherein the feedback communication informs the user that the first records management policy applies to the electronic content.

3. The method of claim 2, wherein the feedback communication prompts the user to store the electronic content in compliance with the first records management policy.

4. The method of claim 1, wherein the electronic content is detected by an automated agent installed at a node at which the electronic content is detected.

5. The method of claim 4, further comprising deploying and configuring the agent at the node.

6. The method of claim 4, wherein the automated agent comprises an RSA data loss prevention agent.

7. The method of claim 1, wherein the feedback communication further comprises providing an alert, a report, a logged event, or other output data to a records administrator indicating that the user has attempted the detected non-compliant action.

8. The method of claim 1, wherein the electronic content comprises a computer file or other electronic document.

9. The method of claim 1, wherein the electronic content comprises a network or other communication.

10. The method of claim 1, further comprising receiving and storing the first records management policy.

11. The method of claim 1, further comprising receiving a designation of one or more active records management supervision nodes to be configured to detect electronic content to which the first records management policy applies.

12. The method as recited in claim 1, wherein the detected action is to create, save, or transmit the electronic content.

13. The method as recited in claim 1, wherein the electronic content is not previously identified as a record and is not subject to any records management policy.

14. The method as recited in claim 1, wherein the electronic content is a record that is previously subject to a second records management policy.

15. The method as recited in claim 1, wherein the first records management policy prescribes at least one of the following with respect to electronic content classified as a record: a mandatory storage duration, location, format, and manner, and a mandatory manner of disposal.

16. The method as recited in claim 1, wherein the detecting of the action with respect to the electronic content includes detecting the action with respect to the electronic content based on regular expression matching, pattern matching, author identity, sender identity, receiver identity, attribute, content, associated metadata, or any combination thereof.

17. An active records management system, comprising:
   a processor configured to:
      detect an action with respect to an electronic content, wherein the electronic content is not previously associated with a first records management policy;
      classify, in response to detecting the action, the electronic content by applying one or more rules, wherein electronic content classified as a record within a predetermined degree of confidence is subject to the first records management policy; and
      in the event that the electronic content is determined to be a record within the predetermined degree of confidence, ensure through automated processing that the at least one detected action with respect to the electronic content is in compliance with the first records management policy including at least in part by: providing feedback communication
in the event that the at least one detected action with respect to the electronic content is determined to be not in compliance with the first records management policy, prompt a user attempting the non-compliant action to indicate a reason for the non-compliant action;
determine whether to perform the non-compliant action based at least in part on the reason indicated by the user; and
determine a manner of providing the feedback communication that will most effectively modify a behavior of the user who attempted the detected non-compliant action to understand and learn how to store the electronic content compliantly in the event it is determined to not perform the non-compliant action based at least in part on the reason indicated by the user, wherein the feedback communication is provided directly to the user who attempted the detected non-compliant action; and
a memory coupled to the processor and configured to store the first records management policy.

18. The system recited in claim 15, wherein the feedback communication informs the user that the first records management policy applies to the electronic content.

19. The system recited in claim 18, wherein the feedback communication prompts the user to store the electronic content in compliance with the first records management policy.

20. The system recited in claim 17, wherein the processor executes computer instructions associated with an automated agent installed at a node at which the electronic content is detected.

21. The system recited in claim 15, wherein the feedback communication further comprises providing an alert, a report, a logged event, or other output data to a records administrator indicating that the user has attempted the detected non-compliant action.

22. The system recited in claim 17, wherein the processor is further configured to receive and store the first records management policy.

23. The system recited in claim 17, wherein the electronic content comprises a computer file or other electronic document.

24. The system recited in claim 17, wherein the electronic content comprises a network or other communication.

25. The system as recited in claim 17, wherein the detected action is to create, save, or transmit the electronic content.

26. The system as recited in claim 17, wherein the electronic content is not previously identified as a record and is not subject to any records management policy.

27. The system as recited in claim 17, wherein the electronic content is a record that is previously subject to a second records management policy.

28. The system as recited in claim 17, wherein the first records management policy prescribes at least one of the following with respect to electronic content classified as a record: a mandatory storage duration, location, format, and manner, and a mandatory manner of disposal.

29. A computer program product to manage electronic records, the computer program product being embodied in a tangible and non-transitory computer readable storage medium and comprising computer instructions for:
detecting an action with respect to an electronic content, wherein the electronic content is not previously associated with a first records management policy;
classifying, in response to detecting the action, the electronic content by applying one or more rules, wherein electronic content classified as a record within a predetermined degree of confidence is subject to the first records management policy; and
in the event that the electronic content is determined to be a record within the predetermined degree of confidence, ensuring through automated processing that the at least one detected action with respect to the electronic content is in compliance with the first records management policy at least in part by:
in the event that the at least one detected action with respect to the electronic content is determined to be not in compliance with the first records management policy, prompting a user attempting the non-compliant action to indicate a reason for the non-compliant action;
determining whether to perform the non-compliant action based at least in part on the reason indicated by the user; and
determining a manner of providing the feedback communication that will most effectively modify a behavior of the user who attempted the detected non-compliant action to understand and learn how to store the electronic content compliantly in the event it is determined to not perform the non-compliant action based at least in part on the reason indicated by the user, wherein the feedback communication is provided directly to the user who attempted the detected non-compliant action.

* * * * *